United States Patent
Terada

(10) Patent No.: US 6,950,602 B1
(45) Date of Patent: Sep. 27, 2005

(54) DIGITAL DATA REPRODUCING AND RECORDING APPARATUS CREATING LATENT DETERIORATION

(75) Inventor: Kosei Terada, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 1139 days.

(21) Appl. No.: 09/620,454

(22) Filed: Jul. 20, 2000

(30) Foreign Application Priority Data

Jul. 28, 1999 (JP) .................................. 11-213866

(51) Int. Cl.[7] .............................................. H04N 5/91
(52) U.S. Cl. ........................................ 386/94; 386/95
(58) Field of Search ..................... 386/46, 94, 95, 386/125, 126; 380/223, 215

(56) References Cited

U.S. PATENT DOCUMENTS

| | | | | |
|---|---|---|---|---|
| 4,575,754 A | * | 3/1986 | Bar-Zohar | .................. 380/215 |
| 4,839,922 A | * | 6/1989 | Imasaki et al. | ............. 380/223 |
| 5,381,476 A | * | 1/1995 | Kimoto et al. | .............. 380/201 |
| 6,460,076 B1 | * | 10/2002 | Srinivasan | .................. 709/219 |
| 6,535,687 B1 | * | 3/2003 | Tinker et al. | .................. 386/94 |
| 6,697,566 B2 | * | 2/2004 | Fujinami et al. | ............ 386/111 |

FOREIGN PATENT DOCUMENTS

| | | |
|---|---|---|
| JP | 10-145360 | 5/1998 |
| JP | 11-24895 | 1/1999 |

* cited by examiner

*Primary Examiner*—Huy Nguyen
(74) *Attorney, Agent, or Firm*—Morrison & Foerster, LLP

(57) ABSTRACT

In a digital data processing apparatus, a storage section stores data representative of digital contents of audio or video. A reproduction section processes the data to reproduce the digital contents. A reading section reads out the data from the storage section and sends the read data to the reproduction section. A generating section alters the read data to generate latent deterioration in the digital contents. A control section rewrites the data stored in the storage section by the altered data, whereby repetition of reading and rewriting of the data accumulates latent deterioration to finally cause an evident deterioration of the digital contents. Optionally, a recording section records the data read out from the storage section to make a copy of the digital contents. In such a case, the control section may operate when the copy is made by the recording section for clearing the data from the storage section to erase an original of the digital contents.

21 Claims, 7 Drawing Sheets

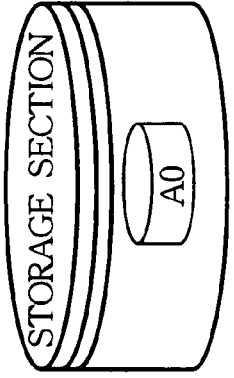
FIG.3 (1)
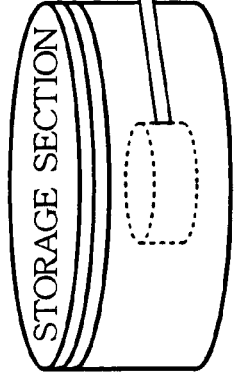
FIG.3 (2)
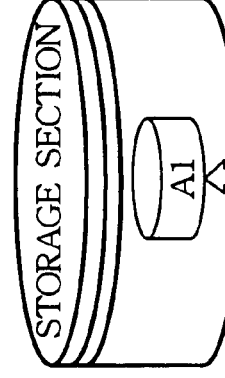
FIG.3 (3)

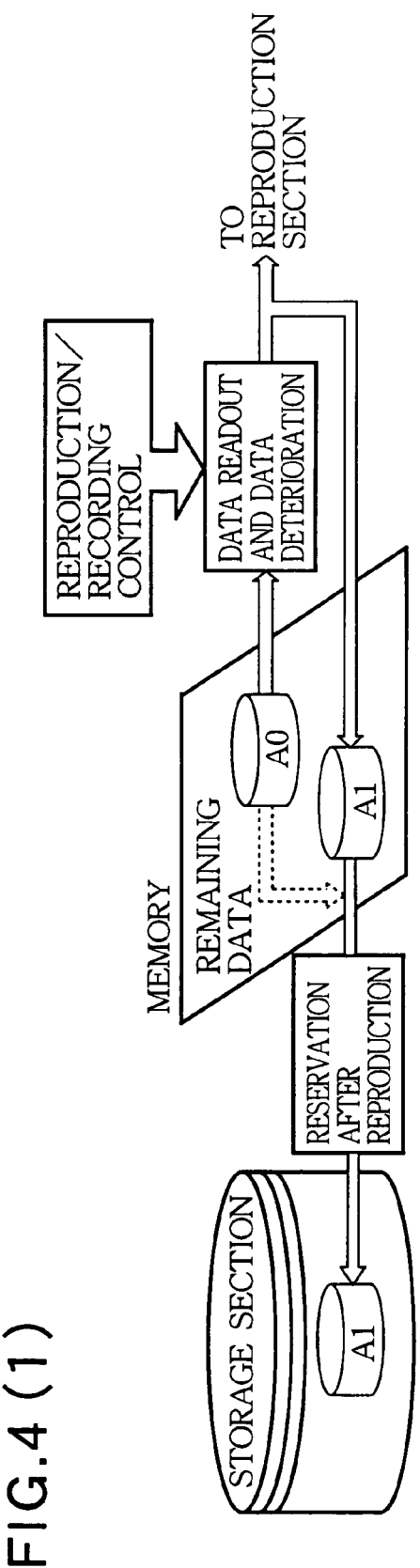
FIG. 4 (1)
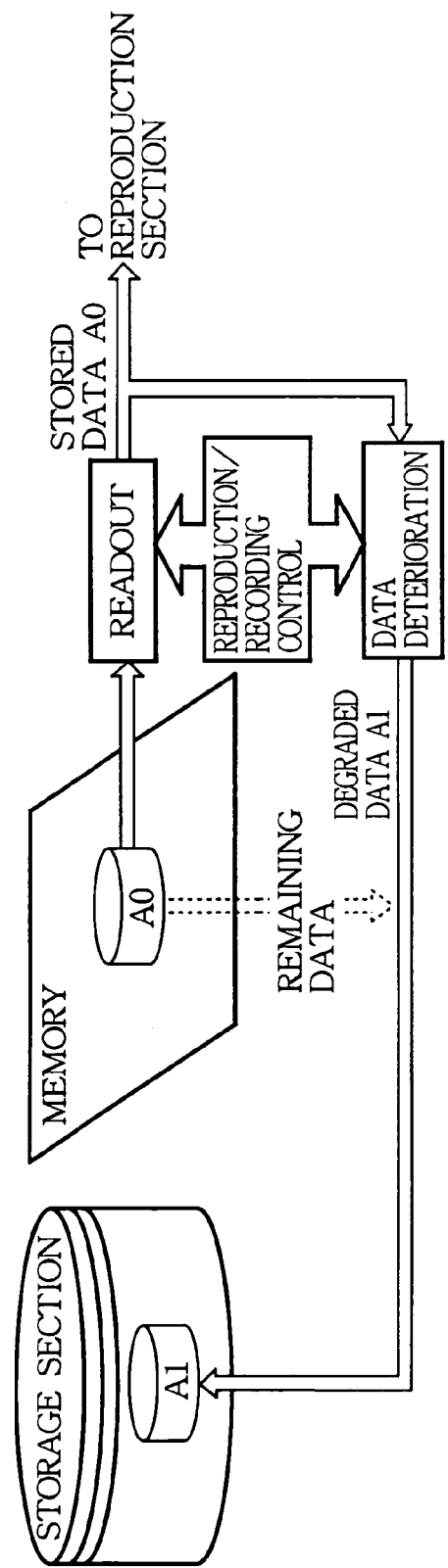
FIG. 4 (2)

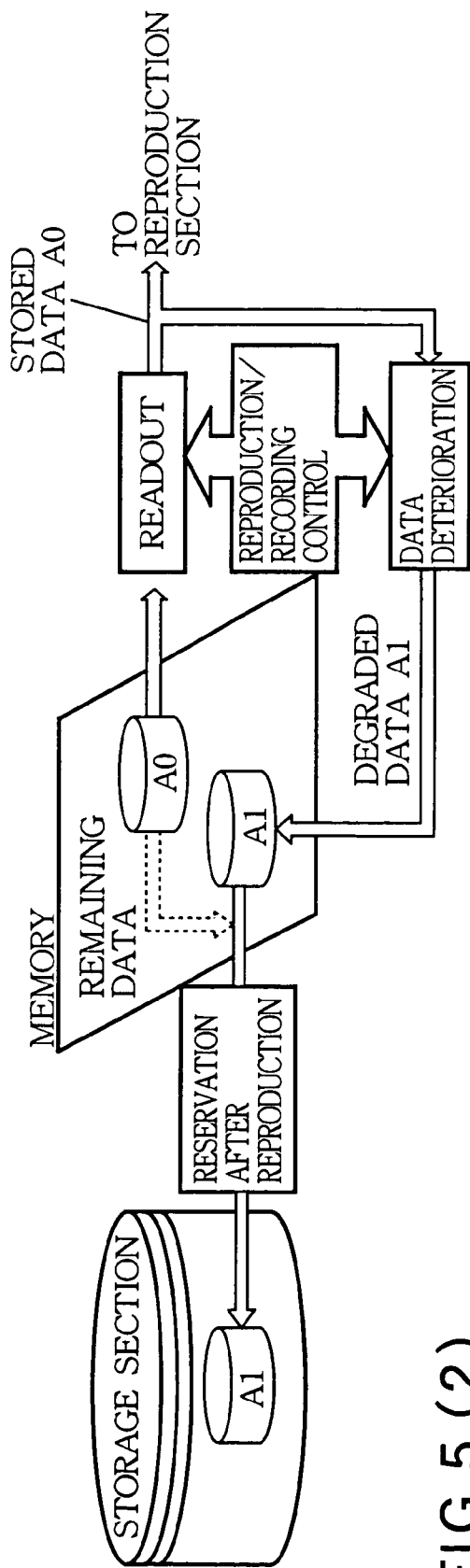
FIG.5 (1)
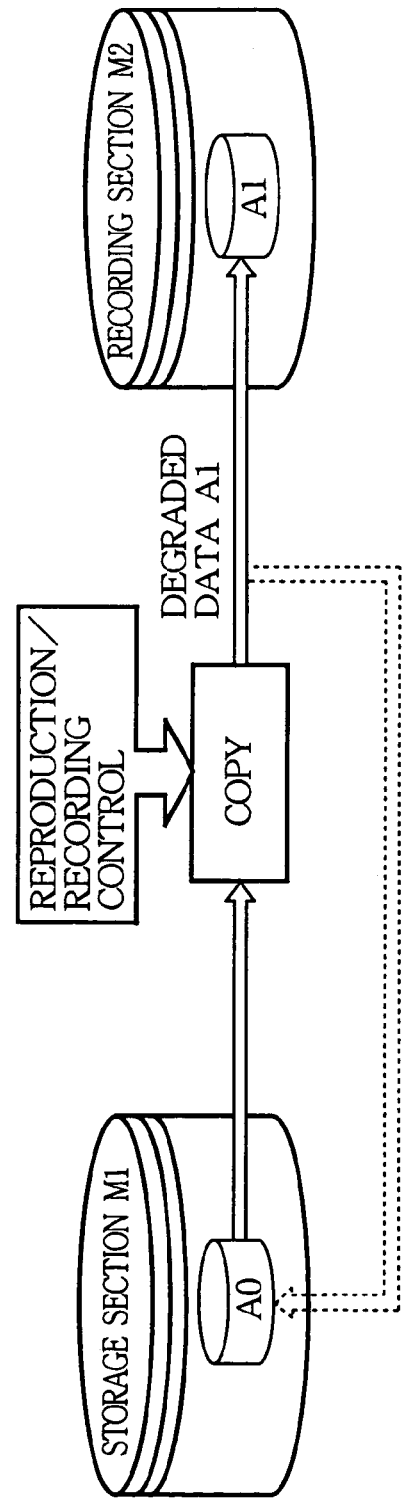
FIG.5 (2)

DIGITAL DATA REPRODUCING AND RECORDING APPARATUS CREATING LATENT DETERIORATION

BACKGROUND OF THE INVENTION

1. Field of the Invention

The present invention relates to a digital data reproducing and recording apparatus, and a digital data reproducing and recording method. More particularly, the present invention relates to an apparatus and method for reproducing and recording digital data such as music, audio and video, which can be distributed through a digital communication network.

2. Prior Art

The industrial field of digital communications has recently developed, in which various contents of digital data are distributed through a digital communication network. The contents of digital data, unlike those of analog data, do not suffer from distortion during transmission, and this makes it possible to distribute the digital contents to users through a network. The use of a digital communication network allows the users to easily download from the network the digital contents such as music, audio and video, which are conventionally difficult to get from a remote place or abroad.

However, since the data is digitized, it is easy to make duplicates of the data, resulting in a flood of duplicates with the quality equivalent to that of the original. This causes danger of threatening all rights of suppliers from which digital contents are distributed through the network, acting as a brake on advances in this field.

To avoid this, some suppliers try to protect the contents in such a way that a guard or protective signal is premixed in the contents to prohibit all users from reproducing the data unless they make a certain contract with the supplier, or that times of reproduction operations or a total playing time is limited under the contract conditions made at the time of purchase, to thereby prohibit the users from reproducing the data over the limited times of reproduction operations or the limited playing time. The former method, however, cannot prevent someone from reproducing the data in breach of contract using a tool for releasing the protective signal superimposed in the data. The latter method also allows someone to release the limit by altering management information managed by a player machine.

Some other suppliers offer data contents for onetime replay on a trial basis. In this case, the data contents are erased and removed from a memory of the player after onetime replay. This attempt will, however, end in failure if a user make a duplicate before the data contents are erased.

SUMMARY OF THE INVENTION

In consideration of these circumstances, it is the main object of the present invention to provide a digital data reproducing and recording apparatus and a digital data reproducing and recording method, that alters the quality of digital data deliberately with a small amount of automatic deterioration each time the digital data is used, with the intention of making the use of the contents finite, to thereby protect all rights of contents suppliers and hence to encourage advances in the industrial field of creation and distribution of digital data contents.

In one aspect of the present invention, there is provided a digital data processing apparatus comprising a storage section that stores original digital data representative of digital contents, a reading section that reads out the original digital data from the storage section, and a generating section that deteriorates a quality of the read original digital data to generate deteriorated digital data.

Preferably, the digital data processing apparatus further comprises an input section that inputs a reproduction command to activate the reading section, a reproduction section that processes the deteriorated digital data for reproducing the digital contents, and a control section that stores back the deteriorated digital data into the storage section such that the reading section operates when a next reproduction command is inputted for reading out the deteriorated digital data from the storage section as new original digital data.

Alternatively, the digital data processing apparatus further comprises an input section that inputs a reproduction command to activate the reading section, a reproduction section that processes the original digital data read out from the storage section for reproducing the digital contents, and a control section that stores back the deteriorated digital data into the storage section such that the reading section operates when a next reproduction command is inputted for reading out the deteriorated digital data from the storage section as new original digital data.

Preferably, the digital data processing apparatus further comprises a downloading section that downloads the original digital data from an external database into the storage section.

Preferably, the digital data processing apparatus further comprises a first control section that controls the generating section to sequentially generate the deteriorated digital data while the reading section reads out the original digital data from the storage section and that sequentially stores back the deteriorated digital data to the storage section, and a second control section that operates when reading of the original digital data is suspended for controlling the storage section to reserve a remaining part of the original digital data as it is without deterioration.

Preferably, the storage section stores the original digital data in the form of original MIDI data having a velocity value and a volume value to represent digital music contents, and the generating section alters at least one of the velocity value and the volume value of the original MIDI data at a random timing to randomly deteriorate the original MIDI data.

Alternatively, the storage section stores the original digital data representative of digital audio and video contents, and the generating section alters the original digital data by noise data at a random timing to thereby randomly deteriorate the original digital data.

Preferably, the generating section sequentially alters the original digital data at a constant timing so as to deteriorate the original digital data.

In another aspect of the invention, a digital data processing apparatus comprises a storage section that stores original digital data representative of digital contents, an input section that inputs a copy command for making a copy of the original digital data in a record medium, a reading section that operates in response to the copy command for reading out the original digital data from the storage section, and a generating section that deteriorates a quality of the read original digital data to generate deteriorated digital data as the copy of the original digital data.

Preferably, the digital data processing apparatus further comprises a downloading section that downloads the original digital data from an external database into the storage section.

Preferably, the storage section stores the original digital data in the form of original MIDI data having a velocity value and a volume value to represent digital music contents, and the generating section alters at least one of the velocity value and the volume value of the original MIDI data at a random timing to randomly deteriorate the original MIDI data.

Alternatively, the storage section stores the original digital data representative of digital audio and video contents, and the generating section alters the original digital data by noise data at a random timing to thereby randomly deteriorate the original digital data.

Otherwise, the generating section sequentially alters the original digital data at a constant timing so as to deteriorate the original digital data.

According to the present invention, since a latent deterioration in the form of a minor change is deliberately made to the digital contents each time the digital contents are reproduced by a digital player, or each time the digital contents are copied or dubbed to make a duplicate, the digital contents are gradually deteriorated.

According to the present invention, the contents are deteriorated each time the contents are reproduced or dubbed to thereby make use of the frequency of digital contents finite. This makes it possible to protect all rights of contents suppliers and hence to encourage advances in the digital contents distributing industry. Further, since the original data are changed into noise data like white noise at random intervals, the data quality continues to degrade evenly in a uniform way according to the frequency of use.

BRIEF DESCRIPTION OF THE DRAWINGS

By way of example and to make the description more clear, reference is made to the accompanying drawings, in which:

FIGS. 3(1) to 3(3) are diagrams schematically illustrating examples of flows of digital data in a digital data reproduction/recording process according to the embodiment of the present invention;

FIGS. 4(1) and 4(2) are diagrams schematically illustrating other examples of flows of digital data in the digital data reproduction/recording process according to the embodiment of the present invention;

FIGS. 5(1) and 5(2) are diagrams schematically illustrating other examples of flows of digital data in the digital data reproduction/recording process according to the embodiment of the present invention;

DETAILED DESCRIPTION OF THE PREFERRED EMBODIMENTS

Referring now to the accompanying drawings, preferred embodiments of the present invention will be described. It should be noted, however, that the following embodiments are an example, and that various changes or modifications can be made within the sprit of the present invention.

Figure 1:
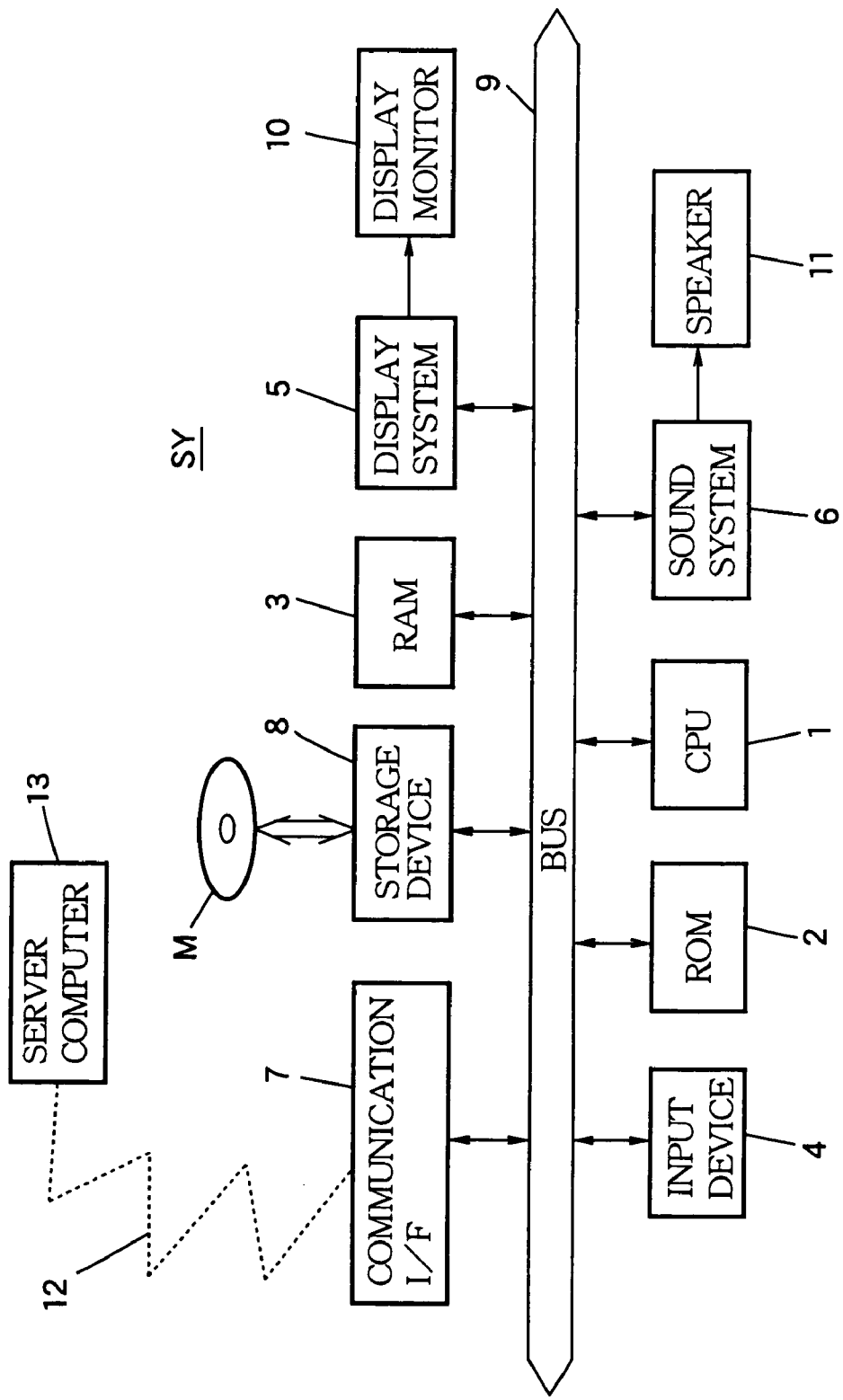
FIG. 1 is a schematic block diagram illustrating a basic hardware configuration of a digital data reproducing and recording system according to an embodiment of the present invention.

FIG. 1 is a schematic block diagram illustrating a basic configuration of a digital data reproducing and recording system according to one embodiment of the present invention. The digital data reproducing and recording system SY includes a central processing unit (CPU) 1, a read-only memory (ROM) 2, a random access memory (RAM) 3, an input device 4, a display system 5, a sound system 6, a communication interface (I/F) 7, and an external storage device 8. These devices 1 through 8 are connected with each other through a bus 9. In general, the system SY assumes the form of a personal computer (PC) having a built-in sound source. Alternatively, the system SY can assume the form of an electronic musical instrument, various kinds of audio/video apparatuses, or a communication karaoke terminal apparatus. These apparatuses are connectable to a communication network.

In the digital data reproducing and recording system SY, the CPU 1 controls the entire system. Particularly, the CPU 1 processes various digital data according to predetermined programs. In particular, the CPU 1 carries out reproduction/recording process as its main functions. To process these digital data, the ROM 2 stores the predetermined programs, a table of random numbers, and predetermined control data such as noise data. The RAM 3 is used as a working area for temporarily storing data and parameters necessary for these operations. The RAM 3 is provided with a random-number register.

The input device 4 is provided with input implements such as a keyboard and a mouse tool. The display system 5 is connected to a display monitor 10. The display system 5 displays, on the display monitor 10, various kinds of visual information that help the user make an input to the digital data reproducing/recording system SY. Video processed by the system SY based on downloaded digital image data can also be displayed on the display monitor 10.

The sound system 6 includes a DSP (Digital Signal Processor). In case that the system assumes the form of an electronic musical instrument or a karaoke terminal apparatus, the sound system 6 may include such a sound source that generates sound of music/voice output data processed by the system SY based on downloaded digital music/voice data. The generated sounds can come out of a speaker 11.

The communication I/F 7 includes a modem or terminal adapter (TA) so that the communication I/F 7 can communicate with a server computer (provider) 13 through a communication network 12 such as a telephone line. The I/F 7 is operative to download the above-mentioned digital data of music pieces and other various multimedia contents of audio and video from the server database to the external storage device 8 provided in the system SY.

The external storage device 8 can treat writable memory media M such as a hard disk (HD), a magneto-optical (MO) disk, a ZIP disk, a CD-R and a smart medium, for use in storing various control programs and the digital data of music pieces and other audio and video. The control program and control data required for the digital data reproduction and recording process can be loaded onto the RAM 3, not only from the ROM 2, but also from any machine readable medium M such as a CD-ROM driven by the external storage device 8.

Figure 2:
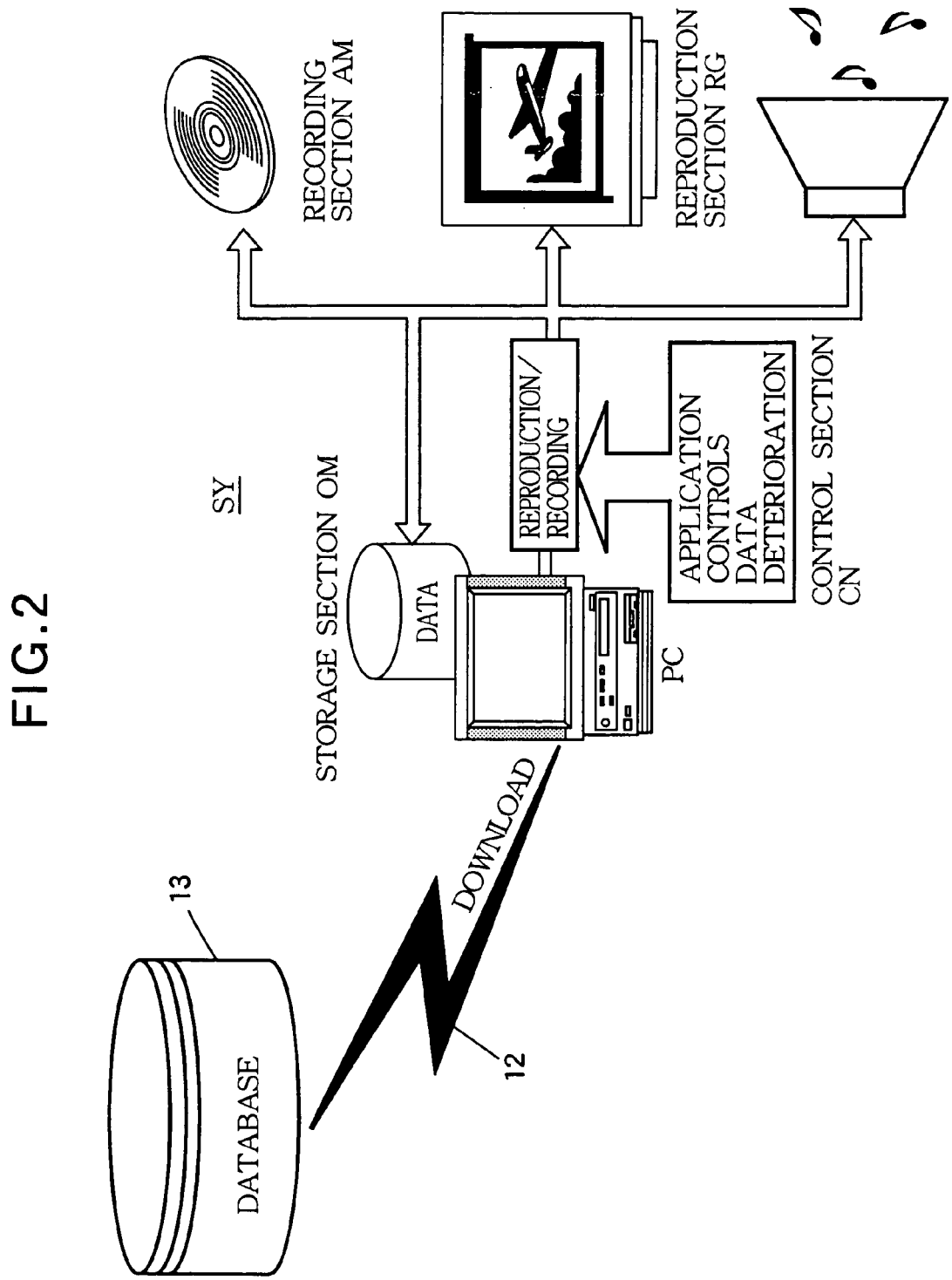
FIG. 2 is a functional block diagram illustrating a general view of a use environment of the digital data reproducing and recording system according to the embodiment of the present invention.

FIG. 2 is a functional block diagram illustrating a general view of a use environment of the digital data reproducing and recording system SY. In FIG. 2, the system SY assumes a personal computer as a typical form as discussed above. The system SY includes a control section CN having the CPU 1 as the main component, a reproduction section RG constituted of the display system 5, the sound system 6 and the like, a data storage section OM composed of the storage device 8, and a recording section AM constituted by an external storage device. The data storage section OM is used to store original digital data to be downloaded, and may include any writable memory media such as a hard disk (HD), an MO disk, a ZIM disk, a CD-R and a smart medium. The recording section AM is also configured in a similar manner as the storage section OM.

The control section CN downloads original digital data of music pieces or other audio and video contents from the database built in the server computer 13 to the system SY through the communication network 12 to store the downloaded data into the data storage section OM. The digital data stored in the data storage section OM can be reproduced through the reproduction section RG, rewritten on the data storage section OM, or recorded on the recording section AM for copying.

In operation, the control section CN functions as a reproduction/recording control module for controlling the downloaded digital data according to application software of the present invention (reproduction/recording process program). Namely, the reproduction/recording control module operates in such a manner as to automatically deteriorate the digital data slightly in negligible manner each time the digital data are reproduced through the reproduction section RG, or each time the digital data are recorded onto the recording section AM. The control section CN is provided for controlling the reproduction section RG and the recording section AM to perform real-time reproduction/recording of streamed digital data as downloaded from the network. In this case, the control section CN applies deterioration control to the streamed digital data.

FIG. 3 is a schematic diagram for explaining the outline of the digital data reproduction process according to the embodiment of the present invention. As discussed above, digital data A0 such as a music or other audio or video is downloaded as original data from the database on the server computer (provider) 15 to the system SY. The storage section OM on which the downloaded data are stored is composed of, for example, a hard disk (HD) of the external storage device 8 in the system SY. As shown in FIG. 3(1), the digital data contents A0 is stored on the HD.

As shown in FIG. 3(2), the control section CN reads the digital data A0 from the storage section OM onto a memory (RAM3). Then, the control section erases the digital data A0 from the storage section OM.

After that, as shown in FIG. 3(3), the control section CN reproduces the digital data A0 while reading the same from the memory (3). In this case, the reproduction/recording module of the present invention makes a minor alteration to the read digital data A0, and then passes to the reproduction section RG digital data A1 that has suffered from deterioration caused by the alteration. The digital data A1 is fed back to the storage section OM so that the digital data A1 will be rewritten as it is, and reserved on the storage section OM. The digital data A1 thus restored on the storage section OM is used for subsequent rounds of reproductions.

For the next round of reproduction, the operating procedures shown in FIGS. 3(2) and 3(3) are applied to the digital data A1, and digital data A2 that suffers from further deterioration due to another alteration made to the digital data A1 is then passed to the reproduction section RG. The digital data A2 that has suffered from the further deterioration is stored onto the storage section OM.

Since the degraded digital data is thus subjected to further deterioration each time the digital data is repeatedly reproduced, the amount of deterioration is gradually increased according to the times of reproductions or the amount of data to be reproduced. After the digital data has been reproduced over and over again, for example, until the time of n-th round of reproductions, the video or audio generated from digital data An in the reproduction process by the reproduction section RG must be so degraded that the user cannot stand viewing or listening the reproduced contents any longer. According to the embodiment, the contents of digital data are deteriorated each time the contents are reproduced, and this limits a term of commercial use of digital data contents.

Namely, in the inventive digital data reproducing apparatus, the storage section OM stores data representative of digital contents of audio or video. The reproduction section RG processes the data to reproduce the digital contents. A reading section reads out the data from the storage section OM and sends the read data to the reproduction section RG. A generating section alters the read data to create latent deterioration in the digital contents. A control section CN rewrites the data stored in the storage section OM by the altered data, whereby repetition of reading and rewriting of the data accumulates latent deterioration to finally cause evident deterioration of the digital contents.

To store back on the storage section OM the digital data A1 that has suffered from deterioration due to the minor alteration made to the digital data A0, other storing methods may be used instead of the above-mentioned method of storing the digital data A1 while reproducing the same through the reproduction section RG. For example, if there are enough memory spaces, as shown in FIG. 4(1), the degraded digital data A1 may be created on the memory before the digital data is passed to the reproduction section RG, and may be stored back on the storage section OM.

FIG. 4(2) shows an example modified from the methods of FIGS. 3(3) and 4(1). In this method, the control section CN sends the reproduction section RG the digital data A0 read from the memory. Then, the reproduction/recording control module makes a minor alteration to the digital data A0 before the data is stored back on the storage section OM, so that the digital data A1 that has suffered from deterioration caused by the alteration is rewritten on the storage section OM. For the first round of reproductions, this method allows the reproduction section RG to generate the original or pure contents of music, video and other audio from the first digital data A0.

The method of FIG. 4(2) can be modified to adopt a recording technique similar to that of FIG. 4(1) to device a variation shown in FIG. 5(1). In this variation, after the digital data A0 is degraded into the digital data A1, the degraded digital data A1 can be developed or buffered on the memory, so that after the completion of reproduction, the digital data A1 will be stored back on the storage section (HD).

However, if digital data of plural music pieces A0, B0, C0, specified by the user are to be read and reproduced sequentially, those methods shown in FIGS. 4(1) and 5(1) may not be appropriate. Those methods shown in FIGS. 4(1) and 5(1) are to return each digital data to the recording section after the completion of reproduction or playback of each music piece through the buffering of the memory. Therefore, those methods shown in FIGS. 4(1) and 5(1) may delay switching between digital data A0 and B0, B0 and C0, and so on. Those methods may hinder smooth transition. Namely, those methods reduce the ability to smoothly switch the preceding digital data to the subsequent digital data without interruption over the course of time. In this case, therefore, it is preferable to adopt such a method, as shown in FIG. 3(3) or 4(2), that feeds back degraded digital data A1, B1, C1, sequentially to the storage section OM while the reproduction section continue reproducing of each data.

In FIGS. 3(3) through 5(1), in case that reproduction is stopped at a midpoint in the digital data A1, the remaining contents of the digital data A1 that have not been read out yet can be fed back to the storage section OM as indicated by the broken line so that the remaining contents will be rewritten on the storage section OM without passing through the deterioration process. This prevents any unused parts of the data contents from being subjected to latent deterioration. Such a method allows the provider to give users a conscientious consideration to all unused portions of the data contents. Namely, the generating section operates when a first part of the read data is reproduced while a second part of the read data is not reproduced by the reproduction section for altering only the first part while saving the second part from altering.

FIG. 5(2) is a diagram illustrating how to make a copy of original data. Of all the external storage devices 8, a storage section M1 stores the digital data A0 as the downloaded original data. According to the present invention, copying of the original data A0 from the storage section M1 to a recording section M2 of the external storage devices 8 is regarded as a use of data. As shown, the reproduction/recording control module makes a minor alteration to the data contents A0 read from the storage section M1, and records the degraded digital data A1 onto the recording section M2.

In operation, the original data A0 may be automatically erased from the storage section M1 after the completion of making the copy. Namely, the control section operates when the copy is made by the recording section M2 for clearing the data from the storage section M1 to erase an original of the digital contents. Otherwise, the original data A0 is replaced by the degraded data A1 as indicated by the broken line. In the latter case, if interruption occurs in the copying process, the preceding part of the data A0 before the interruption can be replaced by the degraded data A1, while the remaining part is rewritten as the original data A0.

As discussed above, since the digital data is deteriorated each time the reproduction/recording of the digital data is carried out, the degree of deterioration of the data contents is increased according to the number of reproduction/recording operations or the amount of data processed. Finally, the quality of the digital contents such as sound and picture obtained from the digital data that have been subjected to deterioration many times becomes so degraded that the user cannot stand listening or viewing the digital contents any longer, and this realizes a possible finite use of digital data contents.

Figure 6:
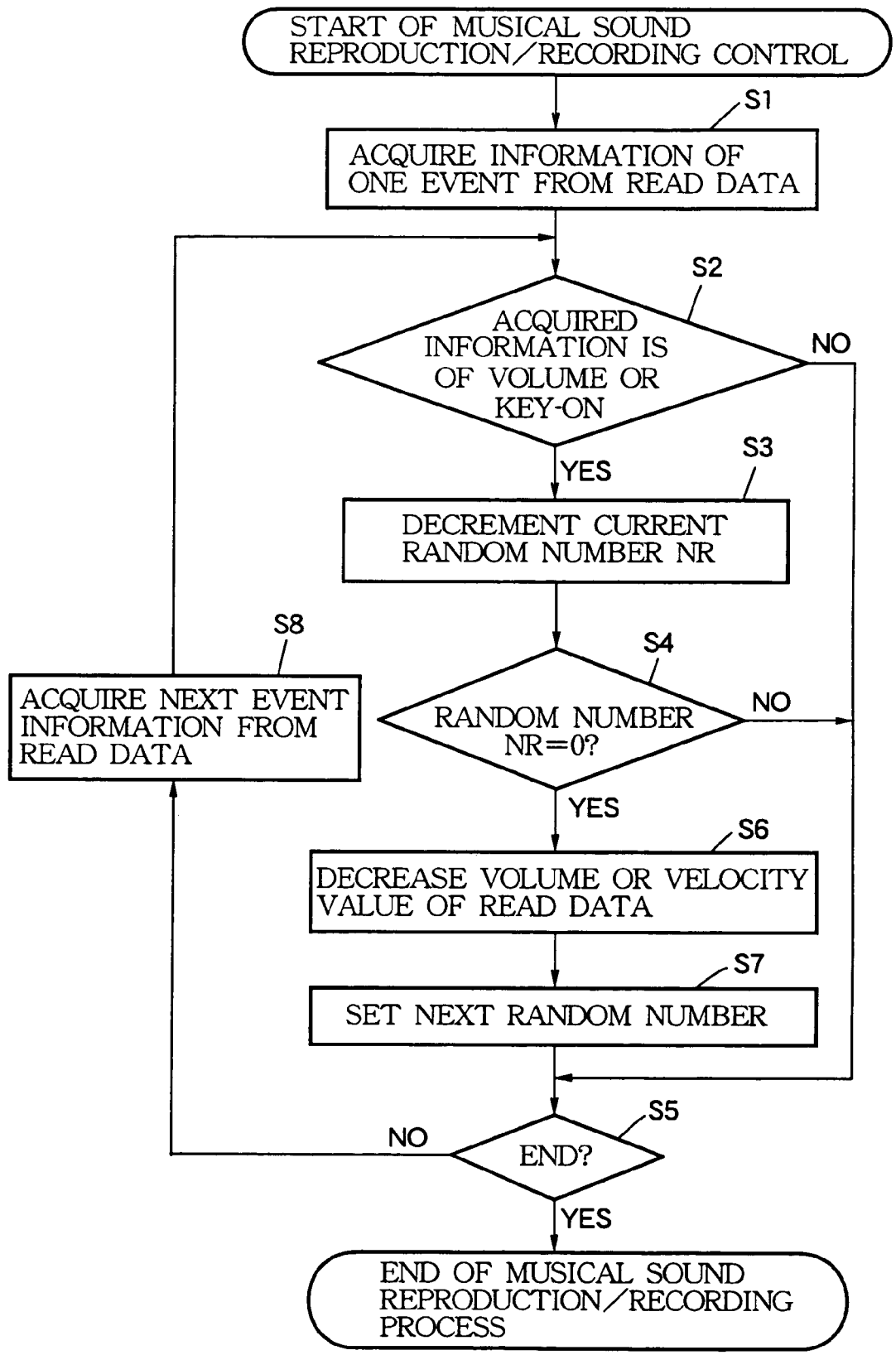
FIG. 6 is a flowchart showing a process of reproducing and recording digital musical sound data according to the embodiment of the present invention.

FIG. 6 is a flowchart showing the process of reproducing and/or recording musical data according to the embodiment of the present invention. It is assumed that digital musical sound data to be downloaded from the server computer 13 through the communication I/F 7 is written in a MIDI (Musical Instrument Digital Interface) format, and that the downloaded digital musical sound data is stored on one of storage sections in the external storage device 8. The flow of operations is commenced when a session of reproducing or copying digital musical sound data is started.

At first, in step S1, a random number NR is read from a table of random numbers stored on the ROM 2. The random number NR is set in the random number register on the RAM 3 according to predetermined initialization procedure, while starting readout of the stored digital musical sound data to be reproduced or recorded. Thus, the first information for one event of music is acquired from the data in this step.

In the next step S2, it is determined whether the acquired event information is of volume information, key-on information or other information. If the information indicates a volume or key-on, the operating procedure goes to step S3. In step S3, the random number NR held in the random number register is subtracted, for example, by decrementing the register by a value 1. After that, the operating procedure goes to step S4, or at all other times, the operating procedure advances to step S5.

In step S4, it is determined whether the current random number NR is 0. If it is 0, the operating procedure goes to step S6. If not, the operating procedure goes to step S5. In step S6, the volume value or velocity value of the event concerned in the read data is reduced by a predetermined value. Then, in step S7, a next random number NR is read from the table of random numbers, and the next random number NR is set in the random number register. After that, the operating procedure goes to step S5.

In step S5, it is determined whether the current session is to end or not, based on the fact that readout of the digital musical sound data is completed, or based on that a reproduction stop operation is detected. If the current session is to end, this process is ended. If not, the operating procedure goes to step S8. In step S8, the next information for one event is acquired from the read digital musical sound data. Then, the operating procedure returns to step S2, and the operations of steps S2 through S8 are repeated. Finally, this process is ended when determined to end in step S5.

According to the embodiment, when the digital musical sound data is read for reproduction or recording, the reproduction/recording control module gradually reduces the data value (the velocity or volume data value for MIDI data) of the read digital musical sound data. Since alterations are deliberately made, the data quality is gradually degraded each time the data is used, and this realizes a possible finite reuse of data.

In step S6, the volume or velocity data value of the MIDI digital musical sound data is simply decreased, but the volume or velocity data value may be reduced according to the ratio of the data value, i.e., a value corresponding to a predetermined percentage may be subtracted from the data value, or the data value may be altered using other different operations.

In order to execute the algorithm of FIG. 6, a machine readable medium M shown in FIG. 1 may be used in the digital data reproducing apparatus having the CPU 1 for reproducing data representing digital contents of audio or video stored in the storage device 8. The machine readable medium M contains program instructions executable by the CPU 1 for causing the digital data reproducing apparatus to perform a method comprising the steps of reading out the data from the storage device 8, altering the read data to create latent deterioration in the digital contents, processing the read data before or after the altering thereof to reproduce the digital contents, and rewriting the data stored in the storage device 8 by the altered data, whereby repetition of reading and rewriting of the data accumulates latent deterioration to finally cause evident deterioration of the digital contents.

Figure 7:
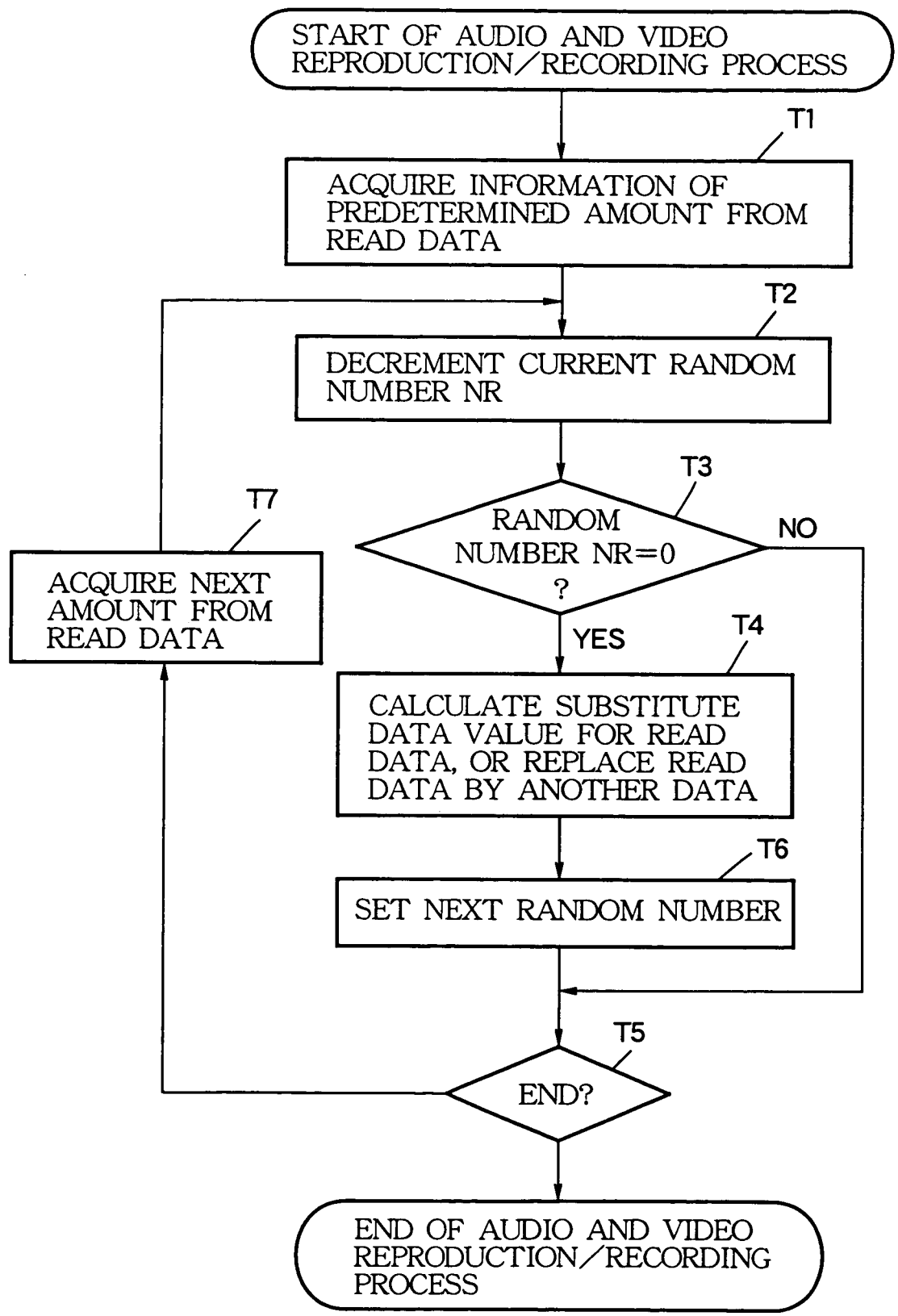
FIG. 7 is a flowchart showing another process of reproducing and recording digital audio or video data according to the embodiment of the present invention.

FIG. 7 is a flowchart showing another process of reproducing/recording digital audio or video data according to the embodiment of the present invention. It is assumed that digital audio or video data to be downloaded from the server computer 13 through the communication I/F 7 is stored on the external storage device 8. The flow of operations is activated to start readout of the data for the reproduction/recording process when a session of reproducing or copying the digital audio or video data is started.

At first, in step T1, a random number NR is read from the table of random numbers stored on the ROM 2, and the random number NR is set in the random number register on the RAM 3, according to predetermined initialization procedure, while starting readout of the stored digital audio or video data to be reproduced or recorded. A predetermined amount of information (e.g., a predetermined number of samples for audio data, a predetermined number of frames for dynamic video data, and a predetermined number of lines for static video data) is latched from the beginning of the read data. Then, the operating procedure goes to step T2.

In step T2, the random number NR placed in the random number register is subtracted, for example, by decrementing the register by a value 1. After that, the operating procedure goes to step T3 in which it is determined whether the current random number NR is 0. If it is 0, the operating procedure goes to step T4. If not, the operating procedure goes to step T5. In step T4, an operation is executed for the acquired fragment of the read data so that the data value of the fragment of the acquired data will be altered into a predetermined noise value. Otherwise, the data value of the fragment will be replaced by a value based on another noise data provided on the ROM beforehand. Namely, the generating section alters the read data by replacing a fragment of the data with another fragment of noise data.

In the next step T6, a next random number NR is read from the table of random numbers, and the next random number NR is newly set in the random number register. After that, the operating procedure goes to step T5.

In step T5, it is determined whether the current session is to end or not, based on the fact that readout of the digital audio or video data is completed, or that a reproduction stop operation is detected. If it is to end, this process is ended. If not, the operating procedure goes to step T7. In step T7, a next fragment in a predetermined amount is acquired from the read digital audio or video data. Then, the operating procedure returns to step T2, and the operations of steps T2 through T7 are repeated. Finally, this process is ended when determined to end in step T5.

According to the embodiment, when the digital audio or video data is read out for the reproduction or recording process, the reproduction/recording control module gradually makes minor alterations to the data contents at random intervals determined by the random number. Namely, the generating section randomly alters the data each time the data is read out from the storage section so as to randomize distribution of latent deterioration in the digital contents. Since the data contents are deliberately altered into noise data, the data quality is gradually degraded each time the data is used, and this realizes a possible finite reuse of digital audio or video data.

In the flow of operations as shown in FIG. 6 or 7, the digital data is altered into noise data at random intervals determined by the random number, but the digital data may be altered into noise data at simply predetermined intervals so that the control configuration will be simplified.

As described above, the present invention provides the following operations. The digital data recorded on the storage section is read, the quality of the digital data is deliberately altered, the read digital data or the digital data with the altered quality is sent to the reproduction section, and the digital data stored on the storage section is replaced by the digital data with the quality altered. Further, when the digital data is copied, the digital data stored on the storage section is read out, the quality of the digital data is deliberately altered, the digital data stored on the storage section is erased, and the digital data with the altered quality is sent to the recording section for copying.

According to the present invention, a minor alteration is deliberately made to the data contents each time the digital contents are reproduced on the player machine, or each time the digital contents are dubbed to make a duplicate. Since the data contents are gradually deteriorated, the use of the digital contents is made finite. This makes it possible to protect all rights of contents suppliers and hence to encourage advances in the contents distributing industry.

What is claimed is:

1. A digital data processing apparatus comprising:
   a storage section that stores original digital data representative of digital contents;
   a reading section that reads out the original digital data from the storage section;
   a generating section that deteriorates a quality of the read original digital data to generate deteriorated digital data; and
   a control section that stores back the deteriorated digital data into the storage section as new original digital data so that the original digital data is overwritten by the new original digital data in the storage section.

2. The digital data processing apparatus according to claim 1, further comprising an input section that inputs a reproduction command to activate the reading section, the generating section and the control section;
   and a reproduction section that processes the new original digital data for reproducing the new original digital data.

3. The digital data processing apparatus according to claim 1, further comprising an input section that inputs a reproduction command to activate the reading section, and a reproduction section that processes the original digital data read out from the storage section for reproducing the original digital data, wherein the generating section deteriorates the quality of the reproduced original digital data.

4. The digital data processing apparatus according to claim 1, further comprising a downloading section that downloads the original digital data from an external database into the storage section.

5. A digital data processing apparatus comprising:
   a storage section that stores original digital data representative of digital contents;
   a reading section that reads out the original digital data from the storage section;
   a generating section that deteriorates a quality of the read original digital data to generate deteriorated digital data;
   a first control section that controls the generating section to sequentially generate the deteriorated digital data while the reading section reads out the original digital data from the storage section and that sequentially stores back the deteriorated digital data to the storage section; and
   a second control section that operates when reading of the original digital data is suspended for controlling the storage section to reserve a remaining part of the original digital data as it is without deterioration.

6. A digital data processing apparatus comprising:
   a storage section that stores original digital data representative of digital contents;

a reading section that reads out the original digital data from the storage section; and a generating section that deteriorates a quality of the read original digital data to generate deteriorated digital data wherein the storage section stores the original digital data in the form of original MIDI data having a velocity value and a volume value to represent digital music contents, and the generating section alters at least one of the velocity value and the volume value of the original MIDI data at a random timing to randomly deteriorate the original MIDI data.

7. The digital data processing apparatus according to claim 1, wherein the storage section stores the original digital data representative of digital audio and video contents, and the generating section alters the original digital data by noise data at a random timing to thereby randomly deteriorate the original digital data.

8. The digital data processing apparatus according to claim 1, wherein the generating section sequentially alters the original digital data at a constant timing so as to deteriorate the original digital data.

9. A digital data processing apparatus comprising:
a storage section that stores original digital data representative of digital contents;
an input section that inputs a copy command for making a copy of the original digital data in a record medium;
a reading section that operates in response to the copy command for reading out the original digital data from the storage section
a generating section that deteriorates a quality of the read original digital data to generate deteriorated digital data as the copy of the original digital data; and
a control section that stores back the deteriorated digital data into the storage section as new original digital data so that the original digital data is overwritten by the new original digital data in the storage section.

10. The digital data processing apparatus according to claim 9, further comprising a downloading section that downloads the original digital data from an external database into the storage section.

11. A digital data processing apparatus comprising:
a storage section that stores original digital data representative of digital contents;
an input section that inputs a copy command for making a copy of the original digital data in a record medium;
a reading section that operates in response to the copy command for reading out the original digital data from the storage sections;
a generating section that deteriorates a quality of the read original digital data to generate deteriorated digital data as the copy of the original digital data; and
wherein the storage section stores the original digital data in the form of original MIDI data having a velocity value and a volume value to represent digital music contents, and the generating section alters at least one of the velocity value and the volume value of the original MIDI data at a random timing to randomly deteriorate the original MIDI data.

12. The digital data processing apparatus according to claim 9, wherein the storage section stores the original digital data representative of digital audio and video contents, and the generating section alters the original digital data by noise data at a random timing to thereby randomly deteriorate the original digital data.

13. The digital data processing apparatus according to claim 9, wherein the generating section sequentially alters the original digital data at a constant timing so as to deteriorate the original digital data.

14. A digital data processing system comprising a server computer and a reproducing apparatus for reproducing original digital data representative of digital contents provided from the server computer, wherein
the server computer comprises a database for use in downloading the original digital data to the reproducing apparatus, and wherein
the reproducing apparatus comprises:
a storage section that stores the original digital data downloaded from the server computer;
an input section that inputs a reproduction command;
a reading section responsive to the reproduction command for reading out the original digital data from the storage section;
a generating section that deteriorates a quality of the read original digital data to generate deteriorated digital data;
a reproduction section that reproduces the digital contents according to the read original digital data before or after the same is deteriorated; and
a control section that stores back the deteriorated digital data into the storage section as new original digital data so that the original digital data is overwritten by the new original digital data in the storage section.

15. A digital data processing system comprising a server computer and a recording apparatus for making a copy of original digital data representative of digital contents provided from the server computer, wherein
the server computer comprises a database for use in downloading the original digital data to the recording apparatus, and wherein
the recording apparatus comprises:
a storage section that stores the original digital data downloaded from the server computer;
an input section that inputs a copy command for making a copy of the original digital data in a record medium;
a reading section that operates in response to the copy command for reading out the original digital data from the storage section;
a generating section that deteriorates a quality of the read original digital data to generate deteriorated digital data as the copy of the original digital data; and
a control section that stores back the deteriorated digital data into the storage section as new original digital data so that the original digital data is overwritten by the new original digital data in the storage section.

16. A method of processing digital data comprising the steps of:
storing original digital data representative of digital contents in a storage device;
reading out the original digital data from the storage device;
deteriorating a quality of the read original digital data to generate deteriorated digital data; and
storing back the deteriorated digital data into the storage section as new original digital data so that the original digital data is overwritten by the new original digital data in the storage section.

17. A method of processing digital data comprising the steps of:
storing original digital data representative of digital contents in a storage device;

inputting a copy command for making a copy of the original digital data in a record medium;

reading out the original digital data from the storage device in response to the copy command;

deteriorating a quality of the read original digital data to generate deteriorated digital data as the copy of the original digital data; and storing back the deteriorated digital data into the storage section as new original digital data so that the original digital data is overwritten by the new original digital data in the storage section.

18. A method of reproducing original digital data representative of digital contents provided from a server computer, comprising the steps of:

downloading the original digital data from a database of the server computer;

storing the original digital data downloaded from the server computer into a storage device;

inputting a reproduction command;

reading out the original digital data from the storage device in response to the reproduction command;

deteriorating a quality of the read original digital data to generate deteriorated digital data;

reproducing the digital contents according to the read original digital data before or after the same is deteriorated; and storing back the deteriorated digital data into the storage section as new original digital data so that the original digital data is overwritten by the new original digital data in the storage section.

19. A method of recording original digital data representative of digital contents provided from a server computer, comprising the steps of:

downloading the original digital data from a database of the server computer;

storing the original digital data downloaded from the server computer into a storage device;

inputting a copy command for making a copy of the original digital data in a record medium;

reading out the original digital data from the storage device in response to the copy command;

deteriorating a quality of the read original digital data to generate deteriorated digital data as the copy of the original digital data; and storing back the deteriorated digital data into the storage section as new original digital data so that the original digital data is overwritten by the new original digital data in the storage section.

20. A machine readable medium for use in a digital data processing apparatus having a processor for processing digital data representing digital contents, the machine readable medium containing program instructions executable by the processor for causing the digital data processing apparatus to perform a method comprising the steps of:

accessing to a storage device storing original digital data representative of digital contents;

reading out the original digital data from the storage device;

deteriorating a quality of the read original digital data to generate deteriorated digital data; and storing back the deteriorated digital data into the storage section as new original digital data so that the original digital data is overwritten by the new original digital data in the storage section.

21. A machine readable medium for use in a digital data processing apparatus having a processor for recording digital data representing digital contents into a record medium, the machine readable medium containing program instructions executable by the processor for causing the digital data processing apparatus to perform a method comprising the steps of;

accessing to a storage device storing original digital data representative of digital contents;

inputting a copy command for making a copy of the original digital data in a record medium;

reading out the original digital data from the storage device in response to the copy command;

deteriorating a quality of the read original digital data to generate deteriorated digital data as the copy of the original digital data; and storing back the deteriorated digital data into the storage section as new original digital data so that the original digital data is overwritten by the new original digital data in the storage section.

* * * * *